United States Patent
Tatzel et al.

(10) Patent No.: US 10,472,005 B2
(45) Date of Patent: Nov. 12, 2019

(54) BELLOWS FOR A PASSAGE BETWEEN TWO ARTICULATED VEHICLES OR OF AN AIR PASSENGER STAIRS OR BRIDGE

(71) Applicant: Hübner GmbH & Co. KG, Kassel (DE)

(72) Inventors: Stefan Tatzel, Fuldabruck (DE); Günther Krug, Guxhagen (DE); Rolf Bingemann, Waldkappel (DE)

(73) Assignee: Hübner GmbH & Co. KG, Kassel (DE)

( * ) Notice: Subject to any disclaimer, the term of this patent is extended or adjusted under 35 U.S.C. 154(b) by 18 days.

(21) Appl. No.: 15/490,048

(22) Filed: Apr. 18, 2017

(65) Prior Publication Data

US 2017/0297638 A1    Oct. 19, 2017

(30) Foreign Application Priority Data

Apr. 18, 2016   (EP) .................................... 16165708

(51) Int. Cl.
| | |
|---|---|
| *B62D 47/02* | (2006.01) |
| *B61D 17/22* | (2006.01) |
| *B32B 5/02* | (2006.01) |
| *B60D 5/00* | (2006.01) |

(52) U.S. Cl.
CPC ............ *B62D 47/025* (2013.01); *B32B 5/024* (2013.01); *B32B 5/026* (2013.01); *B32B 5/028* (2013.01); *B60D 5/003* (2013.01); *B61D 17/22* (2013.01); *B32B 2307/3065* (2013.01); *B32B 2605/00* (2013.01)

(58) Field of Classification Search
CPC ....... B62D 47/025; B32B 5/024; B32B 5/026; B32B 5/028; B32B 5/003; B61D 17/22
See application file for complete search history.

(56) References Cited

U.S. PATENT DOCUMENTS

| | | | | |
|---|---|---|---|---|
| 3,106,503 | A * | 10/1963 | Frobisher ................. | B31D 3/02 |
| | | | | 156/197 |
| 6,196,132 | B1 * | 3/2001 | Hubner .................. | B60D 5/003 |
| | | | | 105/15 |
| 9,920,515 | B2 * | 3/2018 | Xing ......................... | E04D 5/06 |
| 2006/0189236 | A1 * | 8/2006 | Davis ...................... | B32B 27/04 |
| | | | | 442/136 |

FOREIGN PATENT DOCUMENTS

| | | | |
|---|---|---|---|
| DE | 10 2004 043 193 | * | 3/2004 |
| DE | 102004043193 A1 | | 3/2006 |
| DE | 202013000165 U1 | | 4/2013 |
| DE | 202015105102 U1 | | 11/2015 |
| EP | 1 990 563 A1 | * | 12/2007 |
| EP | 1990563 A1 | | 11/2008 |
| EP | 2805812 A1 | | 11/2014 |
| JP | 2006176056A A | | 7/2006 |

\* cited by examiner

*Primary Examiner* — Jacob D Knutson
*Assistant Examiner* — Marlon A Arce

(57) ABSTRACT

A bellows for a passage between two articulated vehicles or for an air passenger stair or bridge has a plurality of folds or waves arranged behind one another. A floor region has at least one inner jacket and at least one outer jacket spaced from the inner jacket. An intermediate layer is disposed between and spaced apart from the inner and outer and is fire-retardant.

18 Claims, 2 Drawing Sheets

BELLOWS FOR A PASSAGE BETWEEN TWO ARTICULATED VEHICLES OR OF AN AIR PASSENGER STAIRS OR BRIDGE

CROSS REFERENCE TO RELATED APPLICATIONS

This Application claims priority to Application EP16165708.5 filed on Apr. 18, 2016 in the European Patent Office.

FIELD OF THE INVENTION

The invention relates to a bellows of a passage between two vehicles connected to one another in an articulated manner or to a bellows of an air passenger stair or of an air passenger bridge having a plurality of folds or waves arranged behind one another, wherein the folds or waves of the bellows have, at least in the floor region, at least one inner jacket and at least one outer jacket arranged spaced apart therefrom, wherein a fire-retardant material is provided between the outer jacket and the inner jacket.

BACKGROUND OF THE INVENTION

A distinction is generally made between rail-bound articulated vehicles such as streetcar trains or railroad trains and road-bound articulated vehicles such as articulated buses. The vehicle parts connected to one another in an articulated manner, for example vehicle parts of a rail vehicle or of an articulated bus have a passage that comprises at least one bellows that surrounds the floor of the passage and optionally also the articulation in a tunnel-like manner to enable persons to change from the one vehicle part to the other vehicle part over the floor without said persons being exposed to weather influences. It must be noted in this connection that the bellows are formed as folding bellows or as wave bellows, with wave bellows in particular being used in rail-bound vehicles and folding bellows in particular being used in articulated buses.

In rail-bound vehicles such as in particular railroad trains, the floor is configured as a link bridge, for example. Such link bridges are sufficiently known from the prior art. It is furthermore also known to configure the floor as a platform, with the use of platforms typically being known with articulated buses. There is in particular now the demand with rail-bound vehicles that the floor of the passage, for example a link bridge, has a certain resistance to the effect of fire in the region of the passage. This means that a specific temperature should not be exceeded over a specific time period at the upper side of the floor of the passage.

It has already been initially pointed out that the bellows surrounds the floor of the passage in a tunnel-like manner; that is, the floor of the passage is also covered by the bellows at the lower side. The bellows thus forms a tube. This means that the floor region of the bellows is located below the floor of the passage, for example, of a link bridge. An origin of a fire is now below the floor region of the bellows so that the floor of the passage is not directly exposed to fire. It becomes clear from this that the heating of the floor of the passage can be delayed for a specific time period, at least in the floor region of the bellows, by a fire-retardant design of the bellows.

The design of a bellows is known in this connection, for example, from DE 20 2015 105 102 U1, wherein an outer strength layer is provided on which a flame-protective layer is arranged at the inner side. A further strength layer can in turn be arranged on this flame-protective layer.

A two-layer design of a bellows is known from EP 1990563 A1 wherein the individual folds or waves of such a bellows have an outer jacket and an inner jacket, that are arranged spaced apart from one another, for forming a two-layer structure. Provision is made in this respect to arrange a fire-protective layer of intumescent material between the inner jacket and the outer jacket. Good results with respect to a delayed heating at the upper side of the floor of the passage have already been achieved using such a design of the bellows, in particular of the bellows bottom.

However, the demands on fire protection have been increased in recent years, with in particular the time period within which a specific temperature at the upper side of the floor of the passage may not be exceeded having been increased.

BRIEF SUMMARY OF THE INVENTION

The underlying object of the invention comprises providing a bellows of the initially named kind that also runs below the floor of a passage and that prevents the temperature at the upper floor side from exceeding a specific predefined value within a specific time period.

Provision is made to achieve this object in accordance with the invention that a wave-like or fold-like intermediate layer is arranged spaced apart from the inner jacket and the outer jacket between the inner jacket and the outer jacket, with the intermediate layer being fire-retardant or flame-retardant. It has been found that a substantial delay in the temperature increase at the upper side of the floor of the passage can thereby be achieved using three layers of a bellows or at least of a bellows floor, wherein the individual layers are arranged spaced apart from one another and the wave-like or fold-like intermediate layer is formed from a fire-retardant or flame-retardant material.

Advantageous features and embodiments of the invention are disclosed herein.

Provision is thus in particular made that the fire-retardant intermediate layer is formed from fire-protective woven fabric, machine-knitted fabric or knitted fabric. This means that the fire-retardant intermediate layer can, for example, be configured as a wire mesh in accordance with a special feature of the invention; it is, however, also conceivable to configure the fire-retardant intermediate layer as a woven fabric, machine-knitted fabric or knitted fabric on the basis of an aramid fiber, silicate fiber, glass fiber and/or polybenzimidazole fiber. Such an intermediate layer acts in a similar manner to a fire-protection wall and provides a significantly delayed heating of the upper side of the floor of a passage. Combinations of the aforesaid materials are also conceivable for the intermediate layer, that is e.g. a mesh of wire and glass fibers.

It has been found to be particularly advantageous for the wave-like or fold-like intermediate layer to have a fire-protection overlay or a fire-protection insert.

It has in particular been found that a significant delay in the heating of the upper side of the floor of the passage is achieved when the fire-protection insert or fire-protection overlay is achieved when the fire-protection inset or fire-protection overlay is configured as swelling up and here in particular as swelling up while forming an ash skeleton. This means that the fire-protection insert or fire-protection overlay comprises an intumescent material.

It has been pointed out at another passage that a two-layer structure of a bellows is known from the already discussed EP 1 990 563 A1 having an inner jacket and an outer jacket arranged spaced apart therefrom, wherein an intumescent material is arranged, e.g. as a cushion, between the outer jacket and the inner jacket. An intumescent material has swelling properties. This means that the material is configured as greatly increasing its volume under the effect of heat. A distinction is made in this respect between intumescent material that swells up in a non-pressurized manner and an intumescent material that swells up when pressurized. It is, however, common to both the material that swells up in a non-pressurized manner and the material that swells up when pressurized that essentially the formation of an ash skeleton is key for the observation of the fire-protection demands. This ash skeleton comprises the swelling fire-protection material, on the one hand, and the residues of the bellows materials, on the other hand, and is comparatively unstable. It tends to collapse into itself in this respect. As soon as this happens, that is, that the ash framework or the ash skeleton forming the insulation layer has collapsed in itself, the surface temperature at the upper side of the floor of the passage increases significantly within a short time. It has already been pointed out that there are materials that swell up while non-pressurized and those that swell up when pressurized. There is the risk with intumescent material that swells up when pressurized that the material completely fills a predefined space. This means that the space between the intermediate layer and the inner jacket is completely filled by the ash skeleton, wherein the inner jacket of the bellows bulges outwardly in the region of the passage due to the swelling process and the space increases its volume to this extent. If such a material were used in a bellows design in accordance with EP 1 990 563 A1, a break in the outer jacket of the bellows would occur relatively fast due to the pressure buildup during the swelling process in conjunction with the strain on the outer jacket by the origin of the fire. The direct consequence of this is that the ash skeleton collapses in itself and falls downward. Directly subsequently to this, the inner jacket of the individual folds or waves of the bellows is exposed to a direct flame impingement, which relatively rapidly results in the destruction of the inner jacket so that the floor of the passage is then itself exposed to the force of the flames. The consequence of this is that the permitted temperature at the upper side of the floor of the passage is exceeded within a very short time.

If now, as is provided in a particular feature of the invention, the fire-protection insert or fire-protection overlay is arranged at the side of such a wave-like or fold-like intermediate layer associated with the inner jacket, the risk that the ash skeleton on the intermediate layer will collapse is considerably smaller. This is in particular the case when the intermediate layer itself is fire-retardant as has already been presented at another passage. The fire-protection insert or fire-protection overlay itself can in this respect be connected to the bellows-like intermediate layer, that is, that the fire-protection is insert, for example, formed as a cushion that is sewn onto the intermediate layer. A fire-protection overlay can be applied by spraying on or by being applied with a brush on the intermediate layer.

The previously described design of a bellows, in particular in the base region of the bellows beneath the floor of the passage, has in particular been proven to be advantageous in a so-called positive-wave bellows. In such a positive-wave bellows, the inner jacket, the outer jacket, and the intermediate layer are arched outwardly, that is in the direction toward the outside of the vehicle or away from the central longitudinal axis of the vehicle, to form individual positive waves, wherein the bellows frames are arranged at the bellows on the inside, that is are arranged in the direction toward the central longitudinal axis of the vehicle, A negative-wave bellows is spoken of when the waves are arched inwardly, that is in the direction of the central longitudinal axis of the vehicle, whereas the bellows frames are arranged at the bellows in the direction of the outside of the vehicle.

BRIEF DESCRIPTION OF THE DRAWINGS

The invention will be described in more detail below by way of example with reference to the drawings.

DETAILED DESCRIPTION OF THE INVENTION

Figure 1:
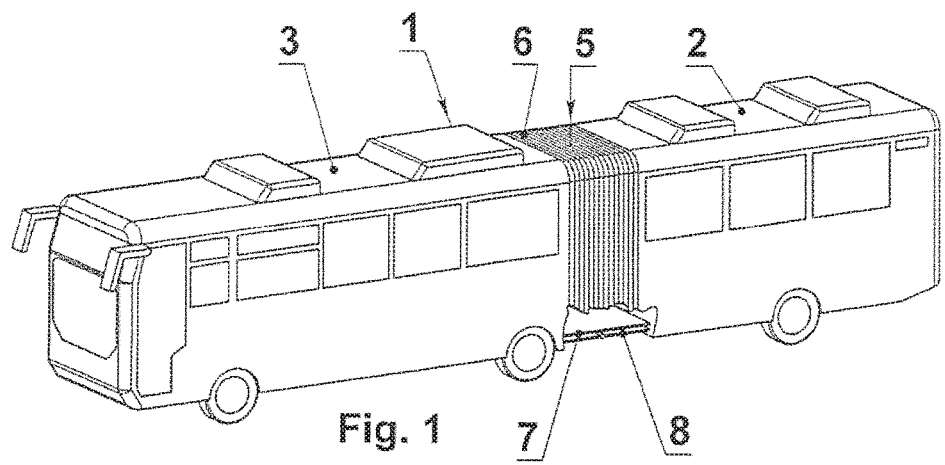
FIG. 1 is a perspective view of an articulated vehicle.

FIG. 1 shows an articulated vehicle 1 having the two vehicle parts 2, 3 that are connected to one another by a passage 5 having a bellows 6. The bellows surrounds the floor 7 and the articulated connection 8 in the manner of a tunnel or pipe.

Figure 2:
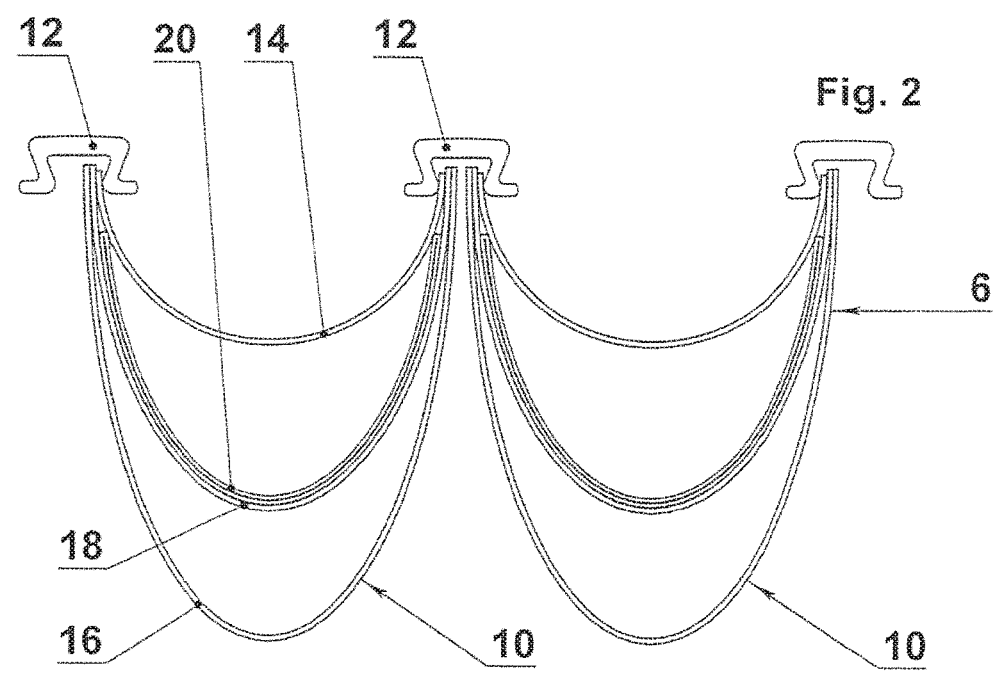
FIG. 2 is a cross-sectional view of an example of two waves of a wave bellows with a fire-protection insert lying on the intermediate layer.

The design of the bellows 6, in particular in the floor region, results from an aspect of FIG. 2. The bellows in the present case comprises individual wave-like elements 10 that are connected to one another by bellows frames 12. The wave-like elements 10 comprise an inner jacket 14 and an outer jacket 16, wherein the intermediate layer 18 likewise of wave-like design is provided spaced apart between the wave-like inner jacket and the wave-like outer jacket. The wave-like intermediate layer 18, that is in particular formed from a fire-retardant material, e.g. on the basis of aramid fibers, silicate fibers, glass fibers and/or polybenzimidazole fibers, has a fire-protection insert 20 at its side facing the inner jacket 14. The fire-protection insert 20 comprises an intumescent, that is fire-retardant, swelling, flexible material that can be commercially purchased.

Figure 3:
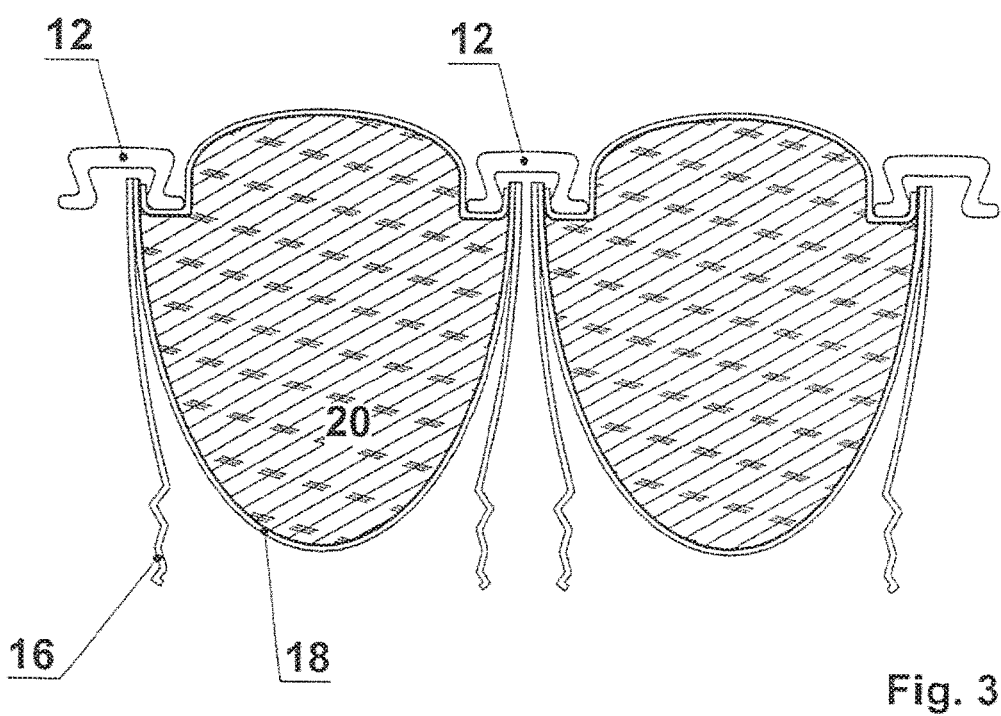
FIG. 3 is a cross-sectional view similar to FIG. 2, wherein the outer jacket of the wave is destroyed and the fire-protection insert is swollen up.

FIG. 3 now shows a state of the waves of a bellow in which the outer jacket 16 is destroyed due to the effect of heat; the fire protection insert is swollen and forms an ash skeleton. Since the intermediate layer, as has already been explained multiple times at another passage, is formed from a fire-retardant or flame-retardant material, this intermediate layer 18 withstands the effect of the flames for a comparatively long time so that the intumescent material can also form an ash skeleton that is relatively stable since it is held by the intermediate layer 18. This means that the ash skeleton can furthermore maintain its function as an insulation layer. A substantial delay in the heating of the upper side of the floor of the passage at flame temperatures of 1000° C. can in particular be achieved with such a structure with a fire-protection insert that lies on the intermediate layer, that can swell when pressurized and that is thus intumescent. The same also applies accordingly with a fire-protection overlay that is, for example, sprayed onto the intermediate layer or is, for example, applied using a brush or a calendar.

The invention is usable not only with positive-wave bellows, but also with negative-wave bellows; negative-wave bellows are spoken of when the arching of the individual waves is directed toward the inside of the bellows.

REFERENCE NUMERAL LIST 1 articulated vehicle
2 vehicle part
3 vehicle part
5 passage
6 bellows
7 floor of the passage
8 articulated connection between the vehicle parts
10 wave-like element
12 bellows frame
14 inner jacket
16 outer jacket
18 intermediate layer
20 fire protection insert

The invention claimed is:

1. A bellows for a passage between two articulated vehicles or for an air passenger stair or bridge, the bellows having a plurality of folds or waves arranged behind one another, the bellows comprising:
a floor region having at least one inner jacket and at least one outer jacket spaced from the at least one inner jacket, the floor region of the bellows surrounding a floor of a passage between two articulated vehicles or for an air passenger stair or bridge; and
a one-piece intermediate layer between and spaced apart from the inner and outer jackets, the intermediate layer being fire-retardant.

2. A bellows according to claim 1, wherein the fire-retardant intermediate layer is a fire-protection woven fabric, machine-knitted fabric or knitted fabric.

3. A bellows according to claim 2, wherein the fire-retardant intermediate layer comprises aramid fibers, silicate fibers, glass fibers and/or polybenzimidazole fibers.

4. A bellows according to claim 1, wherein the fire-retardant intermediate layer is a wire mesh.

5. A bellows according to claim 1, wherein the intermediate layer has a fire-protection overlay or a fire-protection insert.

6. A bellows according to claim 5, wherein the fire-protection overlay or fire protection insert is a swelling material.

7. A bellows according to claim 6, wherein the swelling material is swelling on a buildup of pressure.

8. A bellows according to claim 6, wherein the fire-protection overlay or the fire-protection insert is adapted for swelling while forming an ash skeleton.

9. A bellows according to claim 5, wherein the fire-protection overlay or fire-protection insert is moisture-resistant and/or cleaning agent-resistant.

10. A bellows according to claim 5, wherein the fire-protection overlay or the fire-protection insert is connected to the intermediate layer.

11. A bellows according to claim 5, wherein the fire-protection overlay or the fire-protection insert is disposed on a side of the intermediate layer directed toward the at least one inner jacket.

12. A bellows according to claim 1, wherein the floor region of the bellows is configured as a positive-wave bellows.

13. A bellows according to claim 12, wherein the at least one inner jacket, the at least one outer jacket, and the intermediate layer are each configured as arched in the direction toward the outside of the passage to form individual positive waves.

14. A bellows for a passage between two articulated vehicles or for an air passenger stair or bridge, the bellows having a plurality of folds or waves arranged behind one another, the bellows comprising;
a floor region having at least one inner jacket and at least one outer jacket spaced from the at least one inner jacket, the floor region of the bellows surrounding a floor of a passage between two articulated vehicles or for an air passenger stair or bridge; and
an intermediate layer between and spaced apart from the inner and outer jackets, the intermediate layer being fire-retardant and having a fire-protection overlay or a fire-protection insert of a swelling material, wherein the fire-protection overlay or the fire-protection insert is adapted for swelling while forming an ash skeleton.

15. A bellows according to claim 14, wherein the fire-protection overlay or the fire-protection insert is connected to the intermediate layer.

16. A bellows according to claim 14, wherein the fire-protection overlay or the fire-protection insert is disposed on a side of the intermediate layer directed toward the at least one inner jacket.

17. A bellows according to claim 14, wherein the floor region of the bellows is configured as a positive-wave bellows.

18. A bellows according to claim 17, wherein the at least one inner jacket, the at least one outer jacket, and the intermediate layer are each configured as arched in the direction toward the outside of the passage to form individual positive waves.

* * * * *